United States Patent [19]
Yanniello et al.

[11] Patent Number: 6,088,219
[45] Date of Patent: Jul. 11, 2000

[54] SWITCHGEAR ASSEMBLY WITH REMOVABLE CELL DOOR COVER

[75] Inventors: Robert Yanniello, Asheville; Marlyce J. Scott, Hendersonville, both of N.C.

[73] Assignee: Eaton Corporation, Cleveland, Ohio

[21] Appl. No.: 09/223,194

[22] Filed: Dec. 30, 1998

[51] Int. Cl.$^7$ ...................................................... H02B 1/04
[52] U.S. Cl. .......................... 361/657; 174/67; 312/223.1; 361/614
[58] Field of Search ...................................... 361/605, 608, 361/614, 622, 641, 652, 657; 248/206.5, 309.4; 312/265.5, 265.6, 233.2, 223.1; 174/66, 67, 59, 60

[56] References Cited

U.S. PATENT DOCUMENTS

| | | |
|---|---|---|
| 4,569,462 | 2/1986 | Belokin . |
| 4,753,495 | 6/1988 | Swink . |
| 5,426,406 | 6/1995 | Morris . |
| 5,598,923 | 2/1997 | Owens . |
| 5,727,958 | 3/1998 | Chen . |
| 5,896,273 | 4/1999 | Varghese . |

OTHER PUBLICATIONS

Cutler–Hammer LV Switchgear, "*Magnum DS Low Voltage Power Circuit Breakers and Metal–Enclosed Switchgear*", Publication No. B.44A.01.S.E., May 1998.

*Primary Examiner*—Gerald Tolin
*Attorney, Agent, or Firm*—Martin J. Moran

[57] ABSTRACT

A removable access opening cover is magnetically held in place over an access opening in magnetically permeable cell doors of a switchgear assembly by magnetic strips secured to flanges extending along edges of the cover. A window in the cover allows observation of the interior of an unoccupied cell or monitoring of indicators on the front panel of electrical apparatus such as a circuit breaker mounted in the cell. The cover can be stowed by magnetically attaching it to a magnetically permeable surface such as the metal side wall of the switchgear cabinet.

10 Claims, 2 Drawing Sheets

SWITCHGEAR ASSEMBLY WITH REMOVABLE CELL DOOR COVER

BACKGROUND OF THE INVENTION

1. Field of the Invention

This invention relates to switchgear assemblies and particularly to a switchgear assembly in which removable covers are provided over access openings in the doors of the cells within the switchgear cabinet in which electrical apparatus such as circuit breakers are housed.

2. Background Information

Switchgear assemblies for electric power distribution systems include electrical apparatus housed in metal cabinets with associated conductors, including bus bars and cabling, for connecting the electrical apparatus in appropriate locations within the distribution system. Typically, the electrical apparatus includes switching devices such as circuit breakers or network protectors which provide protection, disconnect switches for isolating parts of the distribution system, and transfer switches for connecting the distribution system to alternative power sources. The electrical apparatus can also include instrumentation such as metering equipment.

In a common arrangement, the electrical apparatus is installed in vertically stacked cells within the cabinet. Each of the cells has a separate door in front of the cabinet through which the electrical apparatus is inserted and removed. Due to the weight and bulk of the electrical apparatus, the cells contain a roll-out carriage on which the electrical apparatus is supported. As the electrical apparatus is rolled into the cell, quick disconnects on the rear face of the electrical apparatus engage stabs which connect the electrical apparatus to the appropriate buses of the distribution system.

In a common arrangement, the cell doors are provided with access openings through which the front face of the electrical apparatus projects for control and monitoring of the electrical apparatus without the need to open the cell door. With such an arrangement, when the electrical apparatus is removed from the cell, or not all of the cells are utilized, the interior of the empty cell is exposed through the access opening which is typically quite large. As the cell contains conductors energized at the system primary voltage, this is not a satisfactory condition. It has been necessary in the past to replace the door with the access opening with a solid front door under these conditions.

There is a need, therefore, for an improved switchgear assembly having cell doors with access openings that prevents access to an empty cell without requiring the replacement of the cell door.

There is a related need for such an improved switchgear assembly that provides for blocking the access opening in the door of an empty cell simply and quickly and without the need for tools.

SUMMARY OF THE INVENTION

These needs and others are satisfied by the invention which is directed to a switchgear assembly which includes for the access opening in at least one door of a cell, a removable access opening cover and means for removably mounting the access opening cover over the access opening. Where at least one of the cell doors and the access opening cover is magnetically permeable, the means mounting the access opening cover comprises magnetic members mounted on either the door or the access opening cover. In the preferred arrangement, the cell doors are steel and the magnetic members are secured to the access opening cover. Preferably, the access opening cover is a panel member having side flanges extending transversely from at least two of the peripheral edges of the panel member. Rear flanges extend inwardly at least from two opposed of the side flanges and are substantially parallel to the panel member. The magnetic members are then secured to these rear flanges.

In a preferred embodiment, the access opening cover has a viewing window through which the interior of the cell is observable with the access opening cover in place. The viewing window is located so that the cover can be used even on a cell which is occupied by an electrical apparatus. More specifically, the window can be aligned for observation of the status indicators on the electrical apparatus. If access to the controls on the electrical apparatus are needed, the access opening cover can easily be removed and replaced when the appropriate action is completed.

Another advantage of the invention is that the removable access opening cover can be easily and conveniently stored by attaching it magnetically to the side of the metal switchgear cabinet or any other nearby magnetically permeable surface.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

Figure 1:
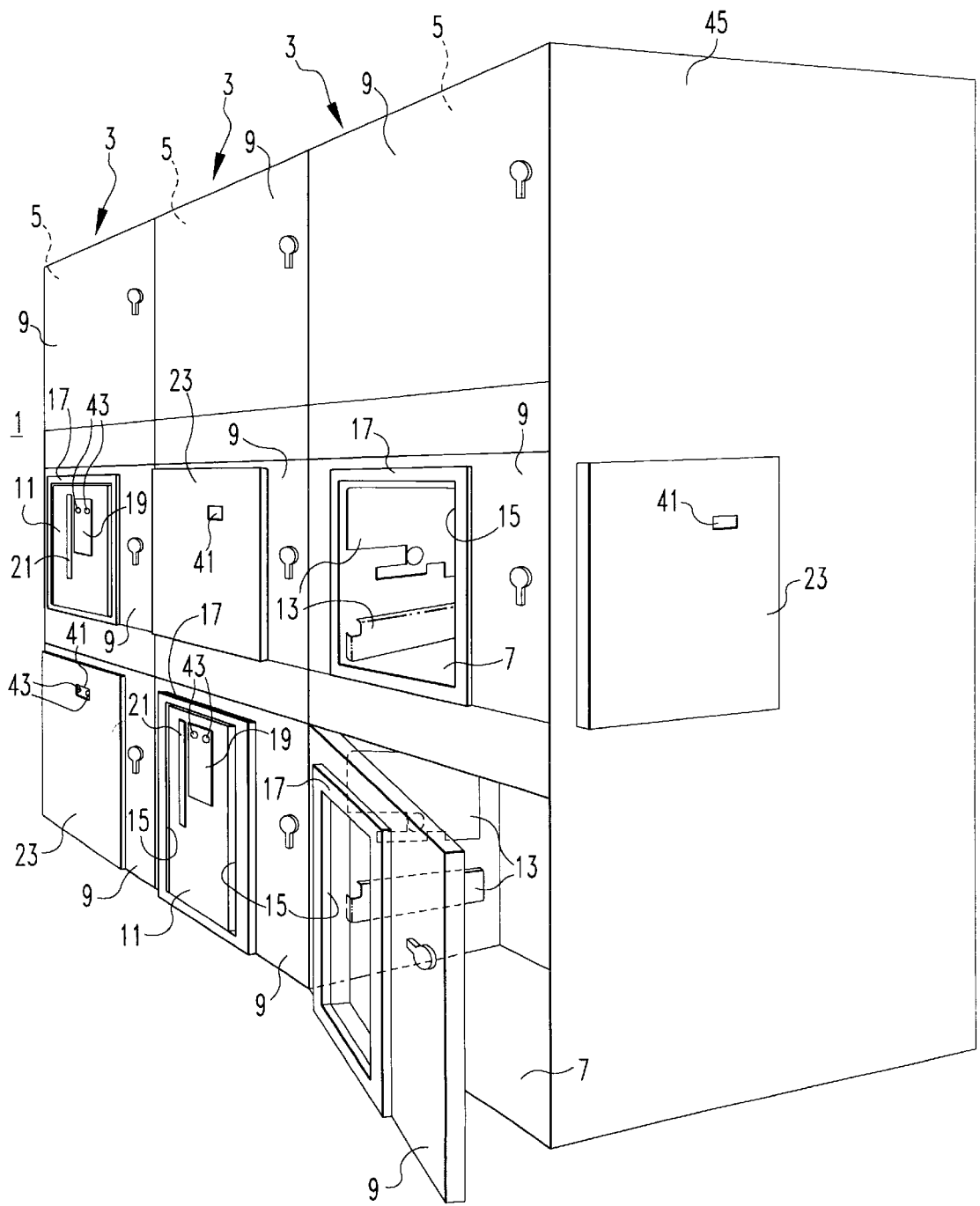
FIG. 1 is a perspective view of a switchgear assembly incorporating the invention.

FIG. 1 illustrates a switchgear assembly 1 incorporating the invention. This switchgear assembly 1 includes a number of metal cabinets 3 (three shown) mounted side-by-side. The metal cabinets 3 each have a forward compartment 5 containing a number (three shown) of vertically stacked cells 7. Each of the cells 7 has a hinged cell door 9 providing access to the cell. The cells 7 are designed to house electrical apparatus 11 such as circuit breakers. The circuit breakers 11 are removably mounted in the cells 7 by a cassette 13.

Preferably, the cell doors 9 have an access opening 15 which is framed by a raised escutcheon 17. With the associated door 9 closed, a circuit breaker 11 mounted by the cassette 13 in one of the cells 7 projects into the access opening 15 as shown in the middle cell of the left-hand cabinet 3 and the bottom cell of the center cabinet. This provides access to a control panel 19 on the circuit breaker 11 and to the charging handle 21.

If a circuit breaker 11 is removed for service or one of the cells is not used in a particular installation, the access opening 15 in the closed door 9 provides a large opening through which the unoccupied cell is accessible. As mentioned, the circuit breakers plug into quick disconnects (not shown) in the rear of the cells 7 for connection to the buses and an electrical distribution system. While in some installations, shutters are provided to limit access to the quick disconnects when a circuit breaker is removed, it is still not advisable to have such a large opening to the empty cell. Of course, in those installations in which shutters are not provided on the quick disconnects, there is a danger of exposed electrically energized conductors.

Figure 2:
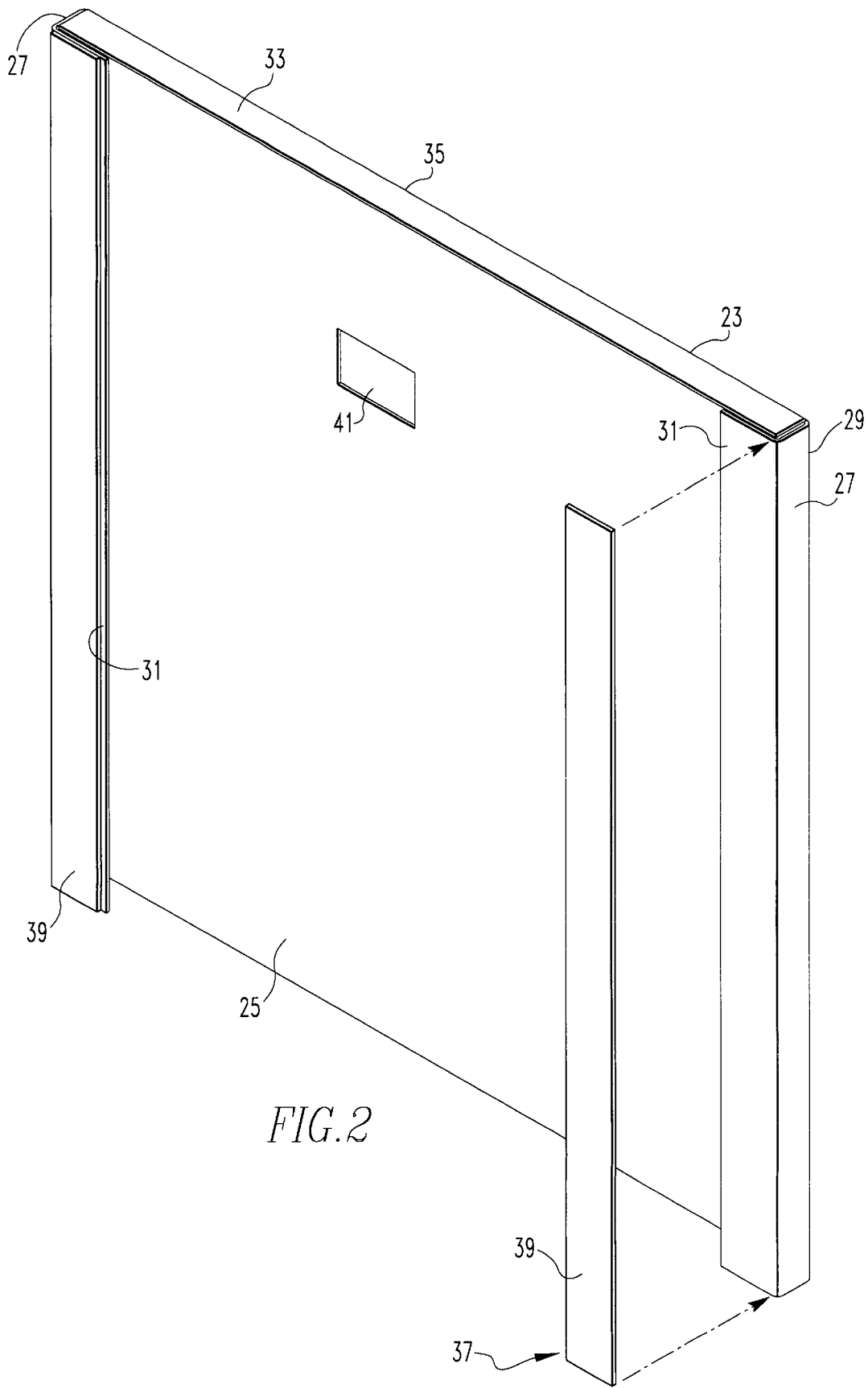
FIG. 2 is an exploded rear isometric view of a removable access opening cover in accordance with the invention.

In accordance with the invention, a removable access opening cover 23 is provided to be placed over the access openings 15 in the cell doors 9. Turning to FIG. 2, the removable access opening cover 23 may be fabricated from sheet material to form a planar panel member 25 having a pair of opposed edge flanges 27 extending rearward along the side peripheral edges 29. Confronting rear flanges 31 extend toward each other substantially parallel to the panel member 25 from the rear edges of the opposed side edge flanges 27. Preferably, a top edge flange 33 extends rearward along a top peripheral edge 35 of the panel member 25.

In accordance with the invention, the removable access opening cover 23 is secured to the cell door 9 by a cover mount 37. Preferably, this is a magnetic mount formed by a pair of magnetic strips 39 secured to the rear flanges 31 such as by an adhesive.

The cell doors 9 are made of a magnetically permeable material such as steel so that when the removable access opening cover 23 is placed over an access opening 15 in a door 9, the edge flanges 27 and 33 fit over the escutcheon 17 and the rear flanges 31 place the magnetic strips 39 against the door 9 to magnetically secure the cover over the access opening. Preferably, the panel member 25 of the removable access opening cover 23 has a window 41 so that the interior of a cell 7 can be viewed while physical access is denied.

The removable access opening cover 23 fits over the escutcheon 17 so that the cover may be used even on a cell 7 in which a circuit breaker 11 is mounted, such as the lower left-hand cell in FIG. 1. Preferably, the window 41 is located in the panel member 25 so that it is aligned with indicators 43 on the operating panel 19 of the circuit breaker allowing observation of the indicators even with the door closed and the removable access opening cover 23 installed.

As indicated, in the preferred embodiment, the magnetic strips 39 are secured to the removable access opening cover 23 and the cell door 9 is magnetically permeable. Alternatively, the magnetic strips 39 could be provided on the cell door 9 along side the access opening 15 for attracting magnetically permeable rear flanges 31 on the removable access opening cover 23. It is preferred though that the magnetic strips be mounted on the removable access cover 23 as shown in FIG. 2. This arrangement is ascetically more pleasing in that there are no magnetic strips visible on the doors when the removable access cover is not used. More importantly, however, with the magnetic strips secured to the removable access cover, the cover can be easily stowed by securing it to a magnetically permeable surface, such as the side wall 45 of the cabinet 3 as shown in FIG. 1.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed is:

1. A switchgear assembly comprising:
   a switchgear cabinet having at least one cell and a door providing access to the cell, said door having an access opening therein;
   at least one electrical apparatus removably mounted in said at least one cell and projecting into said access opening with the door of said at least one cell closed;
   at least one removable access opening cover; and
   means removably mounting said at least one removable access opening cover over said at least one access opening.

2. The switchgear assembly of claim 1 wherein at least one of said door and said removable access opening cover is magnetically permeable, and said means mounting said removable access opening cover comprises magnetic members mounted on the other of said door and said removable access opening cover.

3. The switchgear assembly of claim 2 wherein said removable access opening cover has a viewing window therein.

4. The switchgear assembly of claim 2 wherein said removable access opening cover comprises a panel member having edge flanges on at least two opposed peripheral edges of said panel member and rear flanges extending from said at least two opposed peripheral edge flanges substantially parallel to said panel member.

5. The switchgear assembly of claim 4 wherein said door is magnetically permeable and said magnetic members are secured to said rear flanges.

6. The switchgear assembly of claim 5 wherein said two opposed edge flanges are on sides of said panel member, and including an edge flange extending rearward along a top peripheral edge of said panel member.

7. The switchgear assembly of claim 6 wherein said door has an escutcheon projecting forward around said access opening and said flanges fit over said escutcheon.

8. The switchgear assembly of claim 2 wherein said door is magnetically permeable and said cabinet has a magnetically permeable wall, said at least one magnetically permeable member being mounted on said removable access opening cover which can be selectively mounted over said access opening or stowed against said magnetically permeable wall.

9. The switchgear assembly of claim 1 wherein said cabinet has a plurality of said cells and removable access opening cover is at least one provided for cell not occupied by said electrical apparatus.

10. The switchgear assembly of claim 1 wherein said cabinet has a plurality of cells in which said electrical apparatus can be removably mounted, said electrical apparatus having an indicator on a front face thereof and said removable access opening cover having a view window which registers with said indicator when mounted over an access opening of a door on a cell occupied by said electrical apparatus.

* * * * *